United States Patent
Cho et al.

(10) Patent No.: US 11,307,083 B2
(45) Date of Patent: Apr. 19, 2022

(54) ELECTRONIC DEVICE INCLUDING SCATTERING MEMBER AND LIGHT RECEIVING ELEMENT OBTAINING LIGHT SCATTERED BY SCATTERING MEMBER AND METHOD OF CONTROLLING SAME

(71) Applicant: Samsung Electronics Co., Ltd., Suwon-si (KR)

(72) Inventors: Jeongho Cho, Suwon-si (KR); Donghan Lee, Suwon-si (KR); Jongah Kim, Suwon-si (KR); Heewoong Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 16/541,028

(22) Filed: Aug. 14, 2019

(65) Prior Publication Data
US 2020/0056771 A1   Feb. 20, 2020

(30) Foreign Application Priority Data

Aug. 14, 2018   (KR) ........................ 10-2018-0094896

(51) Int. Cl.
*G01J 1/04* (2006.01)
*F21V 23/04* (2006.01)
(Continued)

(52) U.S. Cl.
CPC ........ *G01J 1/0474* (2013.01); *F21V 23/0464* (2013.01); *F21V 23/0471* (2013.01);
(Continued)

(58) Field of Classification Search
CPC ............. F21V 23/0471; F21V 23/0485; F21V 23/0464; G06F 1/1686; G06F 1/1626;
(Continued)

(56) References Cited

U.S. PATENT DOCUMENTS

| 9,411,458 B2 | 8/2016 | Worfolk et al. |
| 2008/0158173 A1* | 7/2008 | Hamblin ............... G06F 1/1626 345/173 |

(Continued)

FOREIGN PATENT DOCUMENTS

| KR | 10-2014-0024530 A | 3/2014 |
| KR | 10-2017-0020528 A | 2/2017 |

OTHER PUBLICATIONS

ISA/KR, International Search Report and Written Opinion of the International Searching Authority, International Application No. PCT/KR2019/010109, dated Nov. 25, 2019, 8 pages.

*Primary Examiner* — Jennifer D Bennett

(57) ABSTRACT

Various embodiments of the disclosure relate to a proximity-illuminance sensor and an electronic device including the same to increase the accuracy of the illuminance sensor and addressing crosstalk issues. According to an embodiment, an electronic device comprises a transparent member, a scattering member disposed under a portion of the transparent member to scatter light incident at a designated angle from an outside of the electronic device through the transparent member, a light receiving element disposed under the portion and configured to obtain scattered light which is scattered by the scattering member from at least a part of incident light, and a control circuit configured to determine a brightness of the incident light based on, at least, the scattered light obtained through the light receiving element. The electronic device may be implemented in various manners according to embodiments of the disclosure.

17 Claims, 9 Drawing Sheets

(51) Int. Cl.
*G06F 1/16* (2006.01)
*G06F 1/3234* (2019.01)
*G06F 1/3215* (2019.01)
*G06F 1/3231* (2019.01)
*G01J 1/42* (2006.01)

(52) U.S. Cl.
CPC ........ *F21V 23/0485* (2013.01); *G01J 1/4204* (2013.01); *G06F 1/1626* (2013.01); *G06F 1/1686* (2013.01); *G06F 1/3215* (2013.01); *G06F 1/3231* (2013.01); *G06F 1/3265* (2013.01); *Y02D 10/00* (2018.01)

(58) Field of Classification Search
CPC .... G06F 1/3265; G06F 1/3215; G06F 1/3231; G01J 1/4204; G01J 1/0474; Y02D 10/00
See application file for complete search history.

(56) References Cited

U.S. PATENT DOCUMENTS

| | | |
|---|---|---|
| 2008/0199165 A1* | 8/2008 | Ng .................. G03B 17/00 396/51 |
| 2010/0067015 A1 | 3/2010 | Matsushita et al. |
| 2012/0168633 A1 | 7/2012 | Tredwell |
| 2012/0170284 A1* | 7/2012 | Shedletsky .......... G01J 1/0407 362/355 |
| 2013/0048837 A1* | 2/2013 | Pope .................... G01J 1/4204 250/214.1 |
| 2015/0084928 A1 | 3/2015 | Wyrwas et al. |
| 2015/0192717 A1* | 7/2015 | Katagiri ................ G01J 1/0474 359/359 |
| 2017/0211973 A1 | 7/2017 | Jia et al. |
| 2017/0318239 A1* | 11/2017 | Miyasaka ............ G02B 5/0294 |
| 2017/0372114 A1 | 12/2017 | Cho et al. |
| 2018/0164409 A1* | 6/2018 | Chen .................... G01S 7/4813 |

* cited by examiner

ELECTRONIC DEVICE INCLUDING SCATTERING MEMBER AND LIGHT RECEIVING ELEMENT OBTAINING LIGHT SCATTERED BY SCATTERING MEMBER AND METHOD OF CONTROLLING SAME

CROSS-REFERENCE TO RELATED APPLICATION

This application is based on and claims priority under 35 U.S.C. 119 to Korean Patent Application No. 10-2018-0094896 filed on Aug. 14, 2018 in the Korean Intellectual Property Office, the disclosure of which is herein incorporated by reference herein its entirety.

BACKGROUND

1. Field

The disclosure relate to increasing the accuracy of an illuminance sensor and reducing proximate crosstalk in an electronic device including a scattering member and a light receiving element obtaining light scattered by the scattering member.

2. Description of Related Art

Electronic devices are equipped with a proximity sensor to determine whether an object (e.g., a human being) approaches. The proximity sensor may include a light emitting element and a light receiving element to receive light emitted from the light emitting element and reflected by the object. The electronic device may have an illuminance sensor to measure the ambient illuminance through the amount of light incident onto the electronic device. The illuminance sensor may have a light receiving element which is mounted in the same position as or close to the light receiving element of the proximity sensor. According to a certain embodiment, the light receiving element of the illuminance sensor may be integrated with the light receiving element of the proximity sensor. The proximity sensor and the illuminance sensor are mounted on an inactive area (e.g., a black matrix area) of the electronic device.

The amount of light measured by the light receiving elements of the proximity sensor and the illuminance sensor may be different from the amount of light actually incident. In such a case, the electronic device may output a screen higher or lower than a predesignated brightness as compared with the surroundings of the electronic device and, thus, the user may feel uncomfortable. Further, there may occur deviations in per-channel illuminance accuracy of subpixels (e.g., red (R) channels, green (G) channels, blue (B) channels, and clear (C) channels) of the light receiving element depending on the angle of incident light, which may result in inaccurate illuminances.

Various causes may contribute to the differences between the amount of light measured by the light receiving elements of the proximity sensor and illuminance sensor and the amount of light actually incident. Some examples may include differences in performance of the light receiving elements per manufacturer, differences in inclination of the electronic device in the environment of measurement, and differences in the amount of light from the light source, which is incident onto the electronic device. According to a certain embodiment, as the bezel of the electronic device reduces, the field-of-view (FOV) narrows, resulting in the difference between the amount of light measured by the light receiving elements of the proximity sensor and illuminance sensor and the amount of light actually incident. Here, FOV may refer to the angle which leads to an illuminance (lux) corresponding to 50% of the maximum illuminance (max lux) as compared with the maximum illuminance when the angle at which the light incident onto the light receiving element is 0 degrees (i.e., the light is incident in a direction perpendicular to the light receiving element).

The FOV may be formed on the light receiving elements of the proximity sensor and illuminance sensor and be influenced by the size of the opening of the incident light. For example, as the opening enlarges, the FOV may increase and, as the opening shrinks, the FOV may decrease. It is known that a smaller FOV may increase the deviation in the amount of light measured by the light receiving element, thus rendering it difficult to precisely measure the illuminance.

The trend of favoring a smaller bezel for electronic devices reduces the space where the proximity sensor and illuminance sensor are mounted, as well as the opening where light is incident in the electronic device. Thus, the FOV reduces and the electronic device has difficulty in securing an illuminance at a proper accuracy.

The above information is presented as background information only to assist with an understanding of the disclosure. No determination has been made, and no assertion is made, as to whether any of the above might be applicable as prior art with regard to the disclosure.

SUMMARY

According to various embodiments of the disclosure, there are provided an electronic device capable of obtaining a proper accuracy of illuminance although the opening where light is incident is reduced due to a reduced bezel size and a method of controlling the electronic device.

In accordance with an embodiment, an electronic device comprises a transparent member, a scattering member disposed under a portion of the transparent member to scatter light incident at a designated angle from an outside of the electronic device through the transparent member, a light receiving element disposed under the portion and configured to obtain scattered light which is scattered by the scattering member from at least a part of incident light, and a control circuit configured to determine a brightness of the incident light based on, at least, the scattered light obtained through the light receiving element.

In accordance with an embodiment, an electronic device comprises a display, a bezel formed to surround at least a portion of the display, a sensor module disposed in the bezel and including a transparent member formed on an upper surface of the bezel and at least one light receiving element identified from an outside of the electronic device through the transparent member, a scattering member disposed under the transparent member to scatter light coming from the outside of the electronic device to the light receiving element, and a light absorbing member absorbing the light reaching the light receiving element.

In accordance with an embodiment, a sensor module comprises a housing including a front surface, a rear surface, and a side surface surrounding the front surface and the rear surface, at least one opening formed in the front surface, a transparent member disposed inside the housing to abut the front surface, a scattering member disposed under a portion of the transparent member corresponding to the at least one opening to scatter light incident at a designated angle from an outside of the sensor module through the opening, and a light receiving element disposed under the at least one opening and configured to obtain light at least partially scattered by the scattering member.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described with reference to the accompanying drawings.

Figure 1:
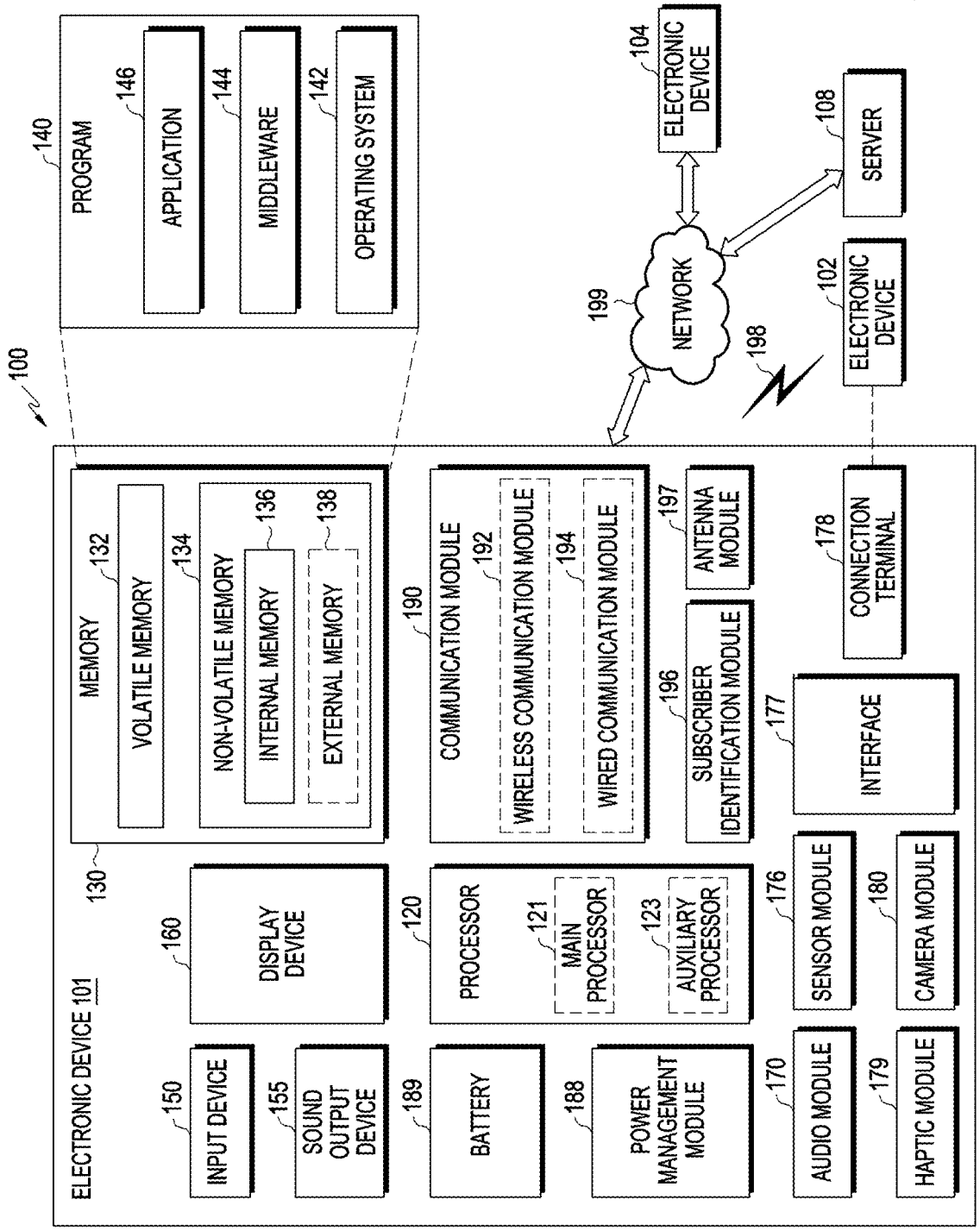
FIG. 1 is a view illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 1801, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
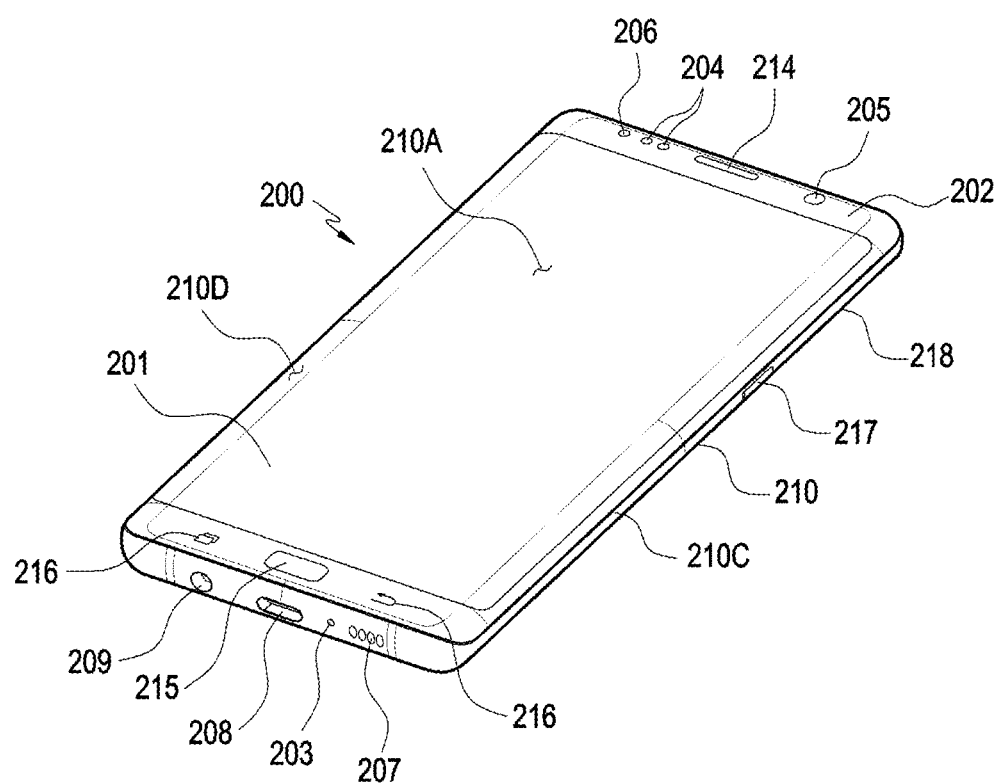
FIG. 2A is a front perspective view illustrating a mobile electronic device according to an embodiment.
Figure 2B:
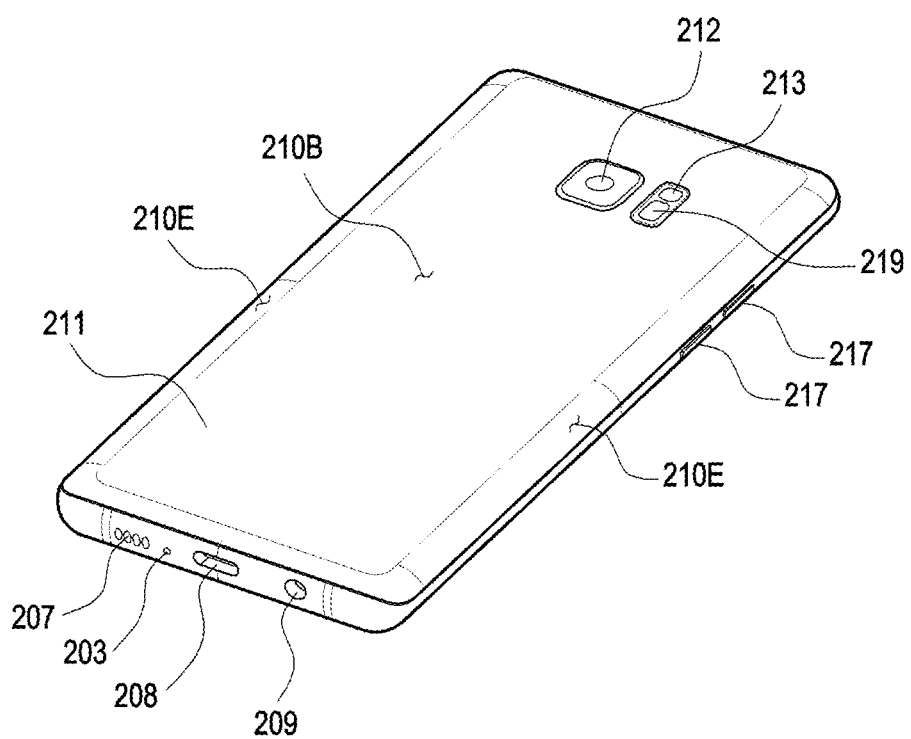
FIG. 2B is a rear perspective view illustrating an electronic device as shown in FIG. 1.

FIG. 2A is a front perspective view illustrating a mobile electronic device 200 (e.g., the electronic device 101 of FIG. 1) according to an embodiment. FIG. 2B is a rear perspective view illustrating the electronic device 200 (e.g., the electronic device 101 of FIG. 1) of FIG. 2.

Referring to FIGS. 2A and 2B, according to an embodiment, the electronic device 200 (e.g., the electronic device 101 of FIG. 1) may include a housing 210 with a first (or front) surface 210A, a second (or rear) surface 210B, and a side surface 210C surrounding a space between the first surface 210A and the second surface 210B. According to another embodiment (not shown), the housing may denote a structure forming part of the first surface 210A, the second surface 210B, and the side surface 210C of FIG. 2A. According to an embodiment, the first surface 210A may be formed by a front plate 202 (e.g., a glass plate or polymer plate with various coat layers) at least part of which is substantially transparent. The second surface 210B may be formed by a rear plate 211 that is substantially opaque. The rear plate 211 may be formed of, e.g., laminated or colored glass, ceramic, polymer, metal (e.g., aluminum, stainless steel (STS), or magnesium), or a combination of at least two thereof. The side surface 210C may be formed by a side bezel structure (or a "side member") 218 that couples to the front plate 202 and the rear plate 211 and includes a metal and/or polymer. According to an embodiment, the rear plate 211 and the side bezel plate 218 may be integrally formed together and include the same material (e.g., a metal, such as aluminum).

In the embodiment illustrated, the front plate 202 may include two first regions 210D, which seamlessly and bendingly extend from the first surface 210A to the rear plate 211, on both the long edges of the front plate 202. In the embodiment (refer to FIG. 3) illustrated, the rear plate 211 may include second regions 210E, which seamlessly and bendingly extend from the second surface 210B to the front plate 202, on both the long edges. According to an embodiment, the front plate 202 (or the rear plate 211) may include only one of the first regions 210D (or the second regions 210E). Alternatively, the first regions 210D or the second regions 210E may partially be excluded. According to an embodiment, at side view of the electronic device, the side bezel structure 218 may have a first thickness (or width) for sides that do not have the first regions 210D or the second regions 210E and a second thickness, which is smaller than the first thickness, for sides that have the first regions 210D or the second regions 210E.

According to an embodiment, the electronic device 200 may include at least one or more of a display 201, audio modules 203, 207, and 214, sensor modules 204, 216, and 219, camera modules 205, 212, and 213, key input devices 217, a light emitting device 206, and connector holes 208 and 209. According to an embodiment, the electronic device 200 may exclude at least one (e.g., the key input device 217 or the light emitting device 206) of the components or may add other components.

The display 201 may be exposed through the top of, e.g., the front plate 202. According to an embodiment, at least a portion of the display 201 may be exposed through the front plate 202 forming the first surface 210A and the first regions 210D of the side surface 210C. According to an embodiment, the edge of the display 201 may be formed to be substantially the same in shape as an adjacent outer edge of the front plate 202. According to an embodiment (not shown), the interval between the outer edge of the display 201 and the outer edge of the front plate 202 may remain substantially even to give a larger area of exposure the display 201.

According to an embodiment (not shown), the screen display region of the display 201 may have a recess or opening in a portion thereof, and at least one or more of the audio module 214, sensor module 204, camera module 205, and light emitting device 206 may be aligned with the recess or opening. According to an embodiment (not shown), at least one or more of the audio module 214, sensor module 204, camera module 205, fingerprint sensor 216, and light emitting device 206 may be included on the rear surface of the screen display region of the display 201. According to an embodiment (not shown), the display 201 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 204 and 219 and/or at least part of the key input devices 217 may be disposed in the first regions 210D and/or the second regions 210E.

The audio modules 203, 207, and 214 may include a microphone hole 203 and speaker holes 207 and 214. The microphone hole 203 may have a microphone inside to obtain external sounds. According to an embodiment, there may be a plurality of microphones to be able to detect the direction of a sound. The speaker holes 207 and 114 may include an external speaker hole 207 and a phone receiver hole 214. According to an embodiment, the speaker holes 207 and 214 and the microphone hole 203 may be implemented as a single hole, or speakers may be rested without the speaker holes 207 and 214 (e.g., piezo speakers).

The sensor modules 204, 216, and 219 may generate an electrical signal or data value corresponding to an internal operating state or external environmental state of the electronic device 200. The sensor modules 204, 216, and 219 may include a first sensor module 204 (e.g., a proximity sensor) disposed on the first surface 210A of the housing 210, and/or a second sensor module (not shown) (e.g., a fingerprint sensor), and/or a third sensor module 219 (e.g., a heart-rate monitor (HRM) sensor) disposed on the second surface 210B of the housing 210, and/or a fourth sensor module 216 (e.g., a fingerprint sensor). The fingerprint sensor may be disposed on the second surface 210B as well as on the first surface 210A (e.g., the display 201) of the housing 210. The electronic device 200 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 205, 212, and 213 may include a first camera device 205 disposed on the first surface 210A of the electronic device 200, and a second camera device 212 and/or a flash 213 disposed on the second surface 210B. The camera modules 205 and 212 may include one or more lenses, an image sensor, and/or an image signal processor. The flash 213 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 200.

The key input device 217 may be disposed on the side surface 210C of the housing 210. According to an embodiment, the electronic device 200 may exclude all or some of the above-mentioned key input devices 217 and the excluded key input devices 217 may be implemented in other forms, e.g., as soft keys, on the display 201. According to an embodiment, the key input device may include the sensor module 116 disposed on the second surface 210B of the housing 210.

The light emitting device 206 may be disposed on, e.g., the first surface 210A of the housing 210. The light emitting device 206 may provide, e.g., information about the state of the electronic device 200 in the form of light. According to an embodiment, the light emitting device 106 may provide a light source that interacts with, e.g., the camera module 205. The light emitting device 206 may include, e.g., an light emitting device (LED), an infrared (IR) LED, or a xenon lamp.

The connector holes 208 and 209 may include a first connector hole 208 for receiving a connector (e.g., a universal serial bus (USB) connector) for transmitting or receiving power and/or data to/from an external electronic device and/or a second connector hole 209 (e.g., an earphone jack) for receiving a connector for transmitting or receiving audio signals to/from the external electronic device.

Figure 3:
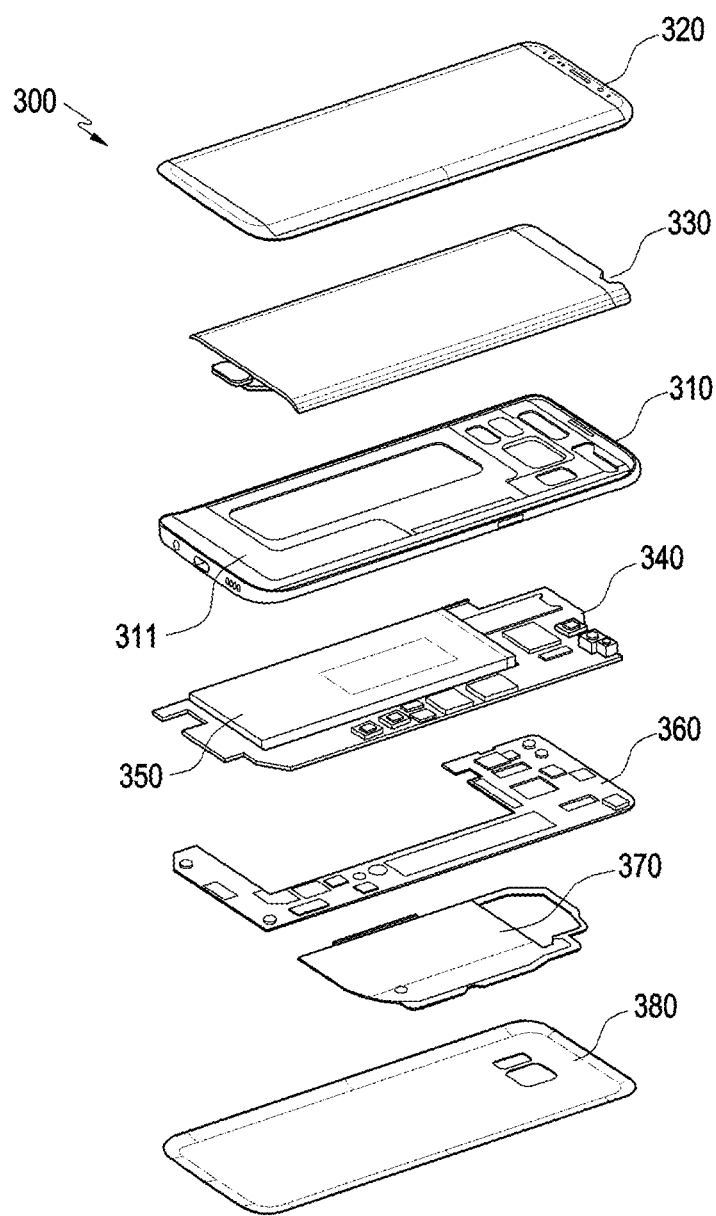
FIG. 3 is an exploded perspective view illustrating an electronic device according to an embodiment.

FIG. 3 is an exploded perspective view illustrating an electronic device 100 according to an embodiment.

Referring to FIG. 3, an electronic device 300 (e.g., the electronic device 101 of FIGS. 1 to 3) may include a side bezel structure 310, a first supporting member 311 (e.g., a bracket), a front plate 320, a display 330, a printed circuit board (PCB) 340, a battery 350, a second supporting member 360 (e.g., a rear case), an antenna 370, and a rear plate 380. According to an embodiment, the electronic device 300 may exclude at least one (e.g., the first supporting member 311 or second supporting member 360) of the components or may add other components. At least one of the components of the electronic device 300 may be the same or similar to at least one of the components of the electronic device 200 of FIG. 2A or 2B and no duplicate description is made below.

The first supporting member 311 may be disposed inside the electronic device 300 to be connected with the side bezel structure 310 or integrated with the side bezel structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multi-media card (MMC) connector, or an audio connector.

The battery 350 may be a device for supplying power to at least one component of the electronic device 300. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment, an antenna structure may be formed by a portion or combination of the side bezel structure 310 and/or the first supporting member 311.

Figure 4A:
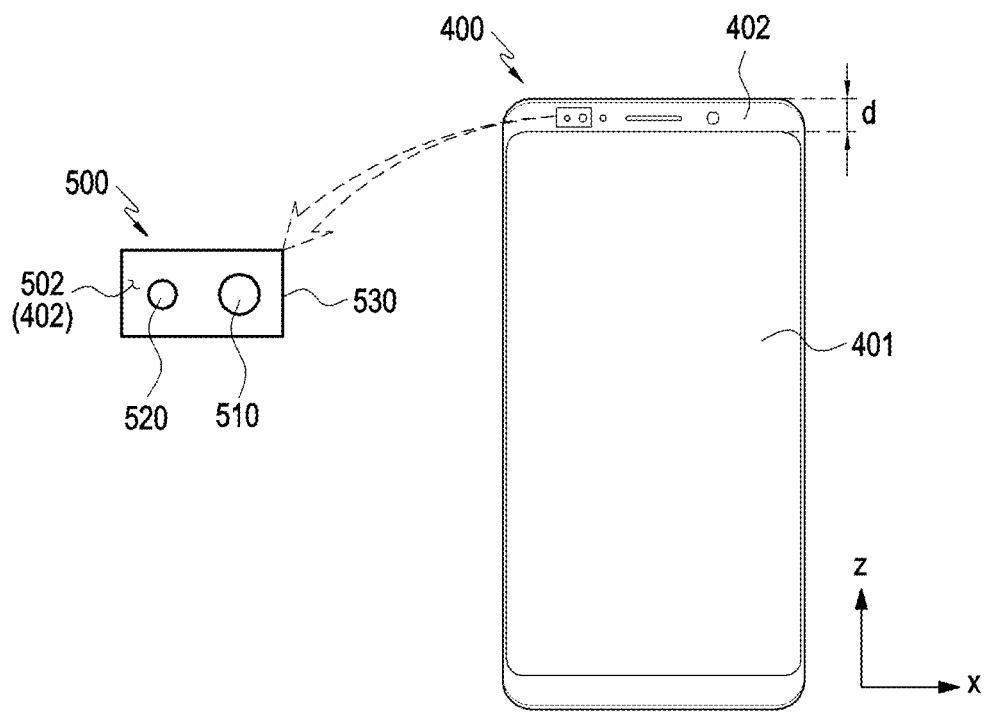
FIG. 4A is a view illustrating an electronic device according to an embodiment.
Figure 4B:
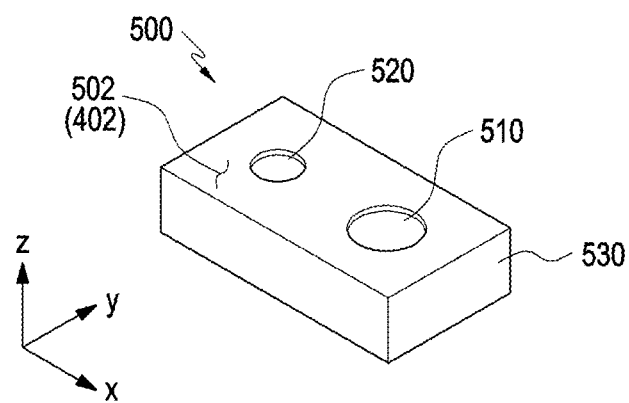
FIG. 4B is a perspective view illustrating a sensor module included in the electronic device of FIG. 4A.

FIG. 4A is a view illustrating an electronic device 400 (e.g., 200 of FIG. 2) and a sensor module 500 (e.g., 204 of FIG. 2) according to an embodiment. FIG. 4B is a perspective view illustrating the sensor module 500 of FIG. 4A.

FIG. 4A illustrates an electronic device 400 having a display 401 mounted in a front plate 402. Referring to FIG. 4A, as viewed from above the front plate 402, the display 401 may occupy most of the area of the front plate 402. A bezel may be formed in part of the front plate 402, which surrounds at least part of the side surface of the display 401.

In the embodiment of FIG. 4A, the sensor may be, e.g., an illuminance sensor, a proximity sensor, or a proximity-illuminance sensor which is the integration of an illuminance sensor and a proximity sensor. The sensor may be modularized into the sensor module 500 which may be included in the electronic device 400. As used herein, "module" may be a single integral component, or a minimum unit or part thereof, adapted to perform one or more functions. For example, according to an embodiment, a module may be implemented in the form of an application-specific integrated circuit (ASIC).

According to an embodiment, the proximity-illuminance sensor module may be a single module in which a proximity sensor and an illuminance sensor are integrated together. The proximity sensor may detect the distance between the electronic device and an external object. The proximity sensor may turn off the screen during a phone call, thereby saving power and preventing a wrong touch on the display due to contacting the user's face. The illuminance sensor may measure the ambient brightness of the electronic device and output an illuminance value for the surroundings, thereby allowing the display brightness to be adjusted. When a particular illuminance (lux) is output from the illuminance sensor depending on the ambient brightness of the electronic device, the brightness of the display may be varied according to a designated brightness table. The use of the illuminance sensor may optimize the screen brightness of the electronic device, thus giving an anti-glare effect while the user uses the electronic device and, as necessary, enhancing visibility and thus preventing unnecessary power waste.

According to an embodiment, although not shown, the sensor module 500 and, e.g., a camera module (e.g., 205, 212, and 213 of FIGS. 2A and 2B) may be packed together.

The sensor module 500 may be disposed in an inactive area of the electronic device 400. For example, the inactive area may mean an area of the bezel (e.g., the first supporting member (e.g., 311 of FIG. 3) or side bezel structure (e.g., 310 of FIG. 3) where the display 401 is not disposed in the front plate 402. The sensor module 500 may be disposed at the top of the front plate 402 as viewed from above the front surface of the electronic device 400 as shown in FIG. 4A. However, this is merely an example, and the sensor module 500 is not limited as so positioned. Alternatively, although not shown, the sensor module 500 may be positioned at the bottom of the front plate 402 or on the rear plate (e.g., 211 of FIG. 2) and/or side bezel structure (e.g., 218 of FIG. 2) of the electronic device 400.

Referring to FIGS. 4A and 4B, according to an embodiment, the sensor module 500 may include a body part 530 with a first opening 510 and a second opening 520. The opening may be a recess, a hole, or a groove. According to an embodiment, the body part 530 may exclude at least one element (e.g., the first opening 510 or the second opening 520) or add another element. For example, when the sensor module 500 is an illuminance sensor module, the body part 530 may have a first opening 510 and, when the sensor module 500 is a proximity-illuminance sensor module, the body part 530 may include a first opening 510 and a second opening 520.

According to an embodiment, the front surface 502 of the sensor module 500 may be a portion included in at least part of the front plate 402 of the electronic device 400. The front surface 502 of the sensor module 500 may be integrally formed with the front plate 402. For example, when the front plate 402 corresponds to a glass plate with various coat layers, at least part of the front plate 402 may be substantially transparent and, thus, at least part of the front surface 502 may be substantially transparent as well.

Alternatively, the front surface 502 of the sensor module 500 may be configured separately from the front plate 402 of the electronic device 400. In such a case, the front surface 502 of the sensor module 500 may be aligned under the substantially transparent portion of the front plate 402. According to an embodiment, the front surface 502 of the sensor module 500 may be stacked adjacent to the bottom of the substantially transparent portion of the front plate 402.

According to an embodiment, the front surface 502 of the sensor module 500 may be formed integrally with, or separately from, the rear plate (e.g., 211 of FIG. 2A or 380 of FIG. 3) and side bezel structure (e.g., 218 of FIG. 2A or 310 of FIG. 3). According to an embodiment, light may pass through the first opening 510 and/or the second opening 520 of the front surface 502. According to an embodiment, the first opening 510 and/or the second opening 520 may correspond to, e.g., the substantially transparent portion of the front plate 402. According to an embodiment, the first opening 510 and the second opening 520 may be a substantially transparent portion of the front surface 502 which is provided separately from the front plate 402. According to an embodiment, the first opening 510 and/or second opening 520 may have a designated light transmittance.

Figure 5:
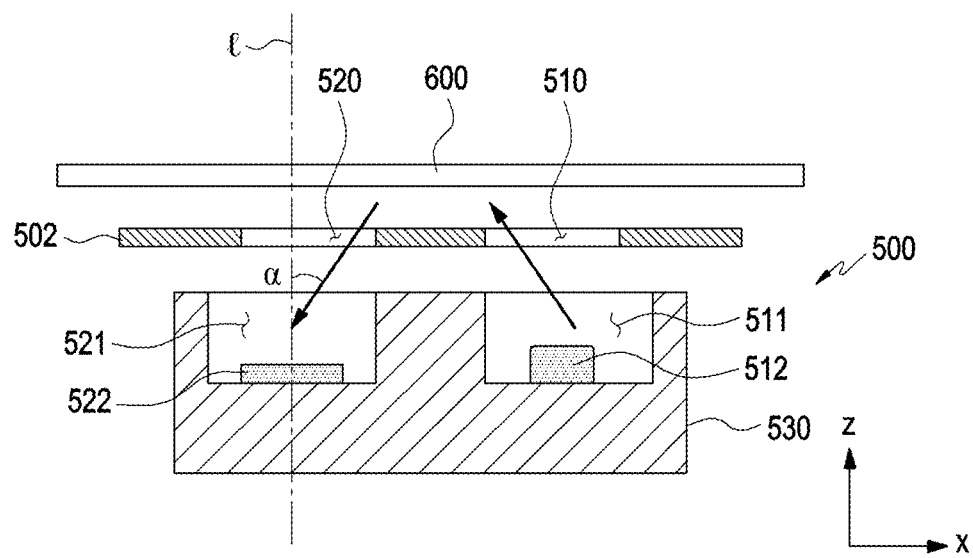
FIG. 5 is a view schematically illustrating a cross section of a sensor module according to an embodiment.

FIG. 5 is a view schematically illustrating a cross section of a sensor module 500 according to an embodiment. According to an embodiment, described below is an example proximity-illuminance sensor module with a first opening 510 and a second opening 520 in a front surface 502.

Referring to FIG. 5, according to an embodiment, the sensor module 500 may include a light emitting element 512. According to an embodiment, the light emitting element 512 may provide state information about the electronic device (e.g., 400 of FIG. 4A) in the form of light. Additionally or alternatively, the light emitting element 512 may provide light (e.g., infrared (IR) light) irrelevant to the state information about the electronic device (e.g., 400 of FIG. 4A).

According to an embodiment, the sensor module 500 may include a light receiving element 522. The light receiving element 522 may be a sensor that receives the ambient light of the electronic device (e.g., 400 of FIG. 4A) and output the brightness of the surroundings of the electronic device (e.g., 400 of FIG. 4A). According to an embodiment, the light receiving element 522 may receive natural light incident from the surroundings of the electronic device (e.g., 400 of FIG. 4A). According to an embodiment, light from the light emitting element 512 may be reflected by an external object 600 to the electronic device (e.g., 400 of FIG. 4) and be received by the light receiving element 522.

As shown in FIG. 5, the light emitting element 512 and the light receiving element 522, respectively, may be disposed in a first space 511 and a second space 521 of the body part 530. The first space 511 and the second space 521 may be set variously depending on the specifications used for the light emitting element 512 and the light receiving element 522. The first space 511 and the second space 521 may be formed in different shapes and volumes.

According to an embodiment, the natural light from the surroundings of the light receiving element 522 or a visible light wavelength and/or IR wavelength of light from the light emitting element 512 disposed around the light receiving element 522 may be reflected by an external object and be received by the light receiving element 522 to thereby measure the illuminance of the surroundings of the electronic device (e.g., 400 of FIG. 4A) or detect the presence or absence of the external object or whether the external object approaches or goes away. According to an embodiment, the light receiving element 522 may include a photo diode to detect light.

Figure 6:
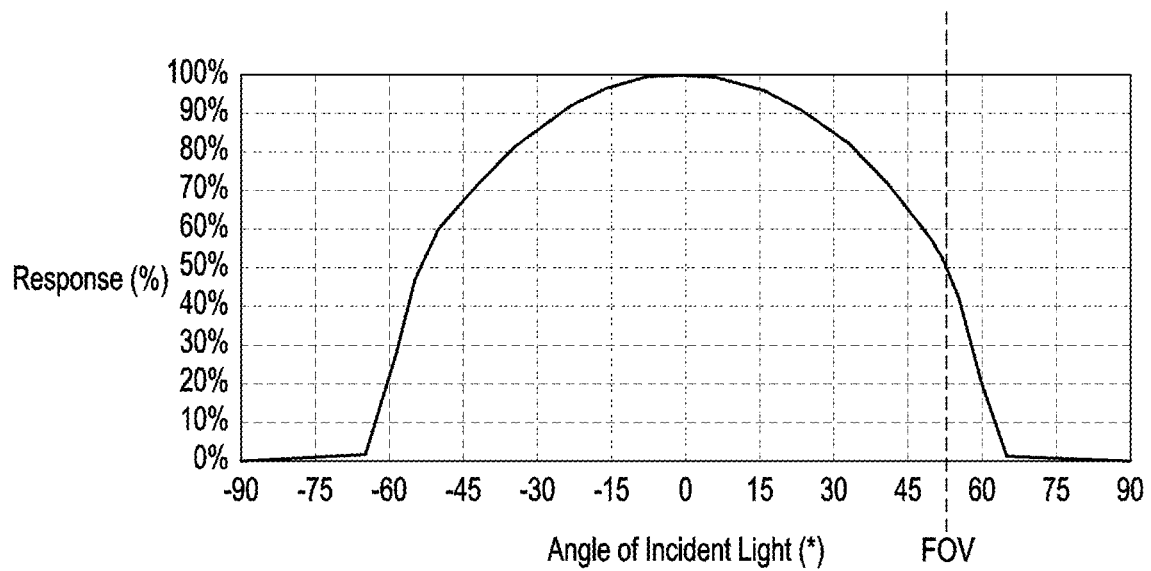
FIG. 6 is a graph illustrating the degree of response of a light receiving element depending on the angle of incident angle.

FIG. 6 is a graph illustrating the degree of response (or sensitivity) of a light receiving element (e.g., 522 of FIG. 5) depending on the angle of incident light.

Referring to FIG. 6, the light receiving element (e.g., 522 of FIG. 5) may exhibit various degrees of response depending on various angles (e.g., α of FIG. 5) of incident light. Here, angle may mean the angle between a virtual line (e.g., 1 of FIG. 5) parallel with the z axis of FIG. 6 and the incident light. The response properties of the light receiving element (e.g., 522 of FIG. 5) may be represented in illuminance units (lux). Upon expressing the performance of the sensor module, the response properties of the light receiving element (e.g., 522 of FIG. 5) may be utilized as a critical yardstick.

The light incident onto the sensor module (e.g., 500 of FIG. 5) may be divided into a first light beam incident perpendicular to the light receiving element (e.g., 522 of FIG. 5) of the sensor module 500 and a second light beam incident inclined with respect to the light receiving element (e.g., 522 of FIG. 5). The performance of the sensor module (e.g., 500 of FIG. 5) may be determined depending on the degree of response (or sensitivity) to the second light beam. According to an embodiment, as compared with the maximum illuminance (max lux) when the angle of light incident onto the sensor module (e.g., 500 of FIG. 5) is 0 degrees, the angle which gives a illuminance (lux) of 50% of the maximum illuminance may be referred to as an FOV. For example, the FOV of the graph of FIG. 6 may be about 54 degrees. According to an embodiment, a larger FOV may be taken as the sensor module (e.g., 500 of FIG. 5) having a higher performance index while a smaller FOV may be taken as the sensor module (e.g., 500 of FIG. 5) having a lower performance index.

The FOV of the sensor module (e.g., 500 of FIG. 5) may be varied depending on, e.g., the specifications from the manufacturer of the light receiving element (e.g., 522 of FIG. 5) and the size of the openings (e.g., the first opening 510 and the second opening 520 of FIG. 5). According to an embodiment, when the light receiving element (e.g., 522 of FIG. 5) includes a plurality of subpixels (e.g., R channels, G channels, B channels, and C channels), a different FOV may be provided per subpixel.

Figure 7:
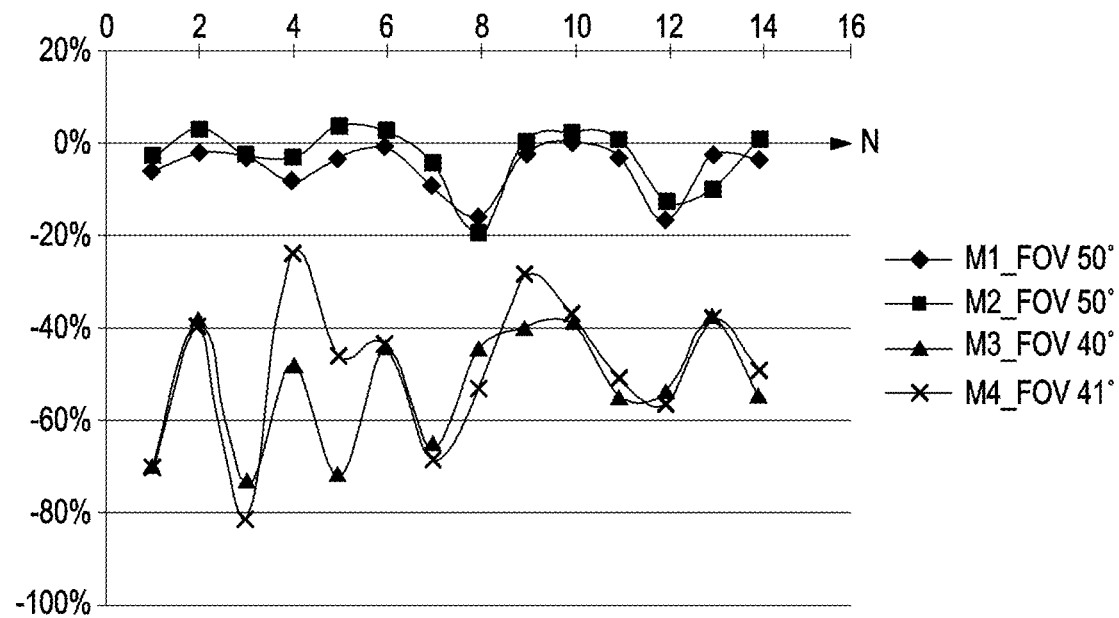
FIG. 7 is a graph illustrating the accuracy of illuminance of various scattering members.

FIG. 7 is a graph illustrating illuminances measured for various sensor modules M1, M2, M3, and M4 (e.g., 500 of FIG. 5). The graph of FIG. 7 may be the results of measurement with an electronic device (e.g., 400 of FIG. 4A) with a sensor module (e.g., 500 of FIG. 5) placed in the actual use environment. Here, the horizontal axis may denote the measurement count, and the vertical axis may denote the accuracy of illuminance. As samples mounted in the electronic device (e.g., 400 of FIG. 4A), two different sensor modules M1 and M2 with an FOV of about 50 degrees, a sensor module M3 with an FOV of about 40 degrees, and a sensor module M4 with an FOV of about 41 degrees are used.

Referring to FIG. 7, for the electronic device (e.g., 400 of FIG. 4A) with the two different sensor modules M1 and M2 with an FOV of about 50 degrees, it may be identified that there is no significant deviation in illuminance accuracy in various measurement environments. Referring to FIG. 7, it may be identified that as the FOV reduces, the illuminance accuracy decreases. For example, it may be identified in the second experiment that the sensor module M1 shows an illuminance accuracy of about +3% whereas the sensor module M3 shows an illuminance accuracy of about −40%. According to an embodiment, comparison between the group of the two sensor modules M1 and M2 with a relatively high FOV and the group of the two sensor modules M3 and M4 with a relatively low FOV reveals that the group of the two sensor modules M3 and M4 with a relatively low FOV presents a larger absolute illuminance accuracy deviation value. It may thus be identified that the electronic device (e.g., 400 of FIG. 4A) may be implemented to improperly operate relative to the actual environment (e.g., the electronic device may output a darker or brighter screen as compared with the actual environment) depending on the FOV differences of the sensor module M1, M2, M3, or M4 included therein.

Figure 8:
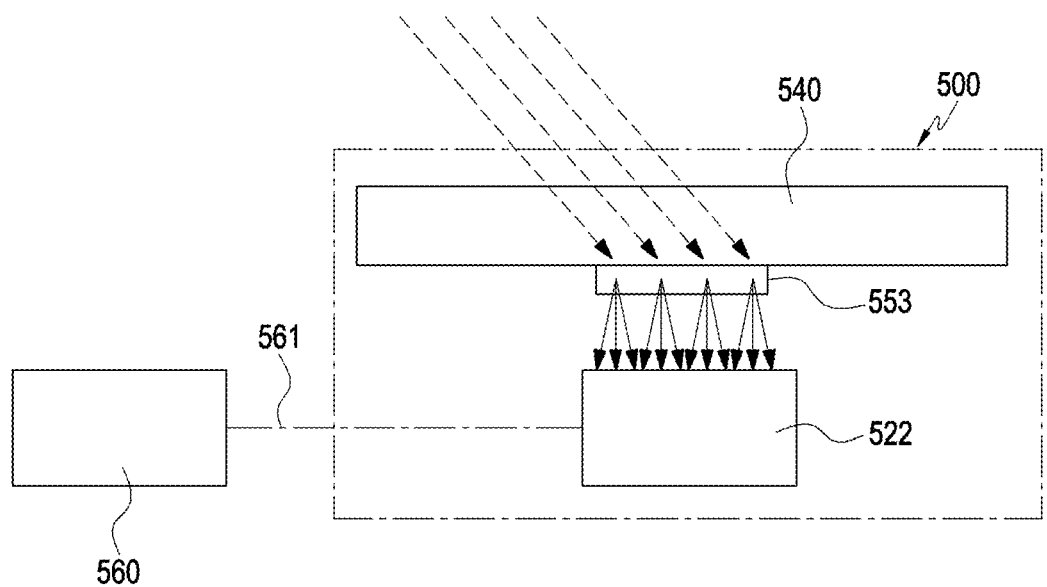
FIG. 8 is a concept view illustrating an electronic device including a scattering member and a light receiving element according to an embodiment.
Figure 9A:
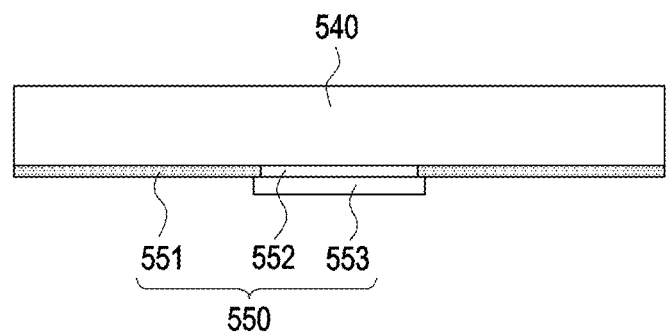
FIG. 9A is a concept view illustrating a transparent member and a scattering member according to an embodiment.
Figure 9B:
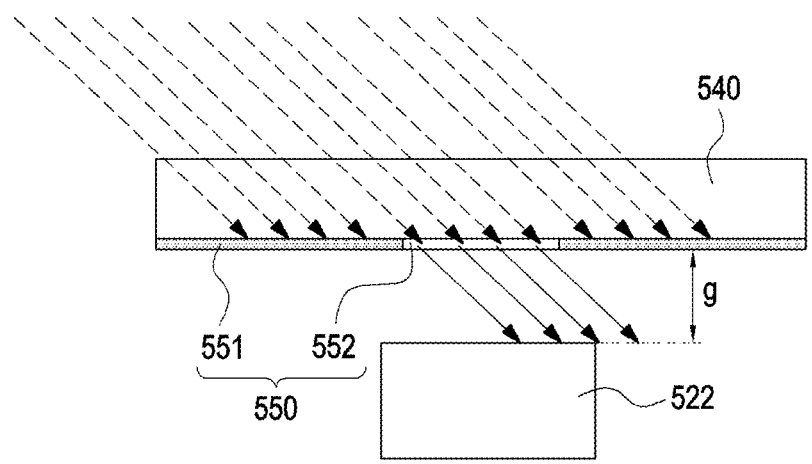
FIG. 9B is a view illustrating an example in which incident light is transmitted through a transparent member to a light receiving element when no scattering member is provided according to an embodiment.
Figure 9C:
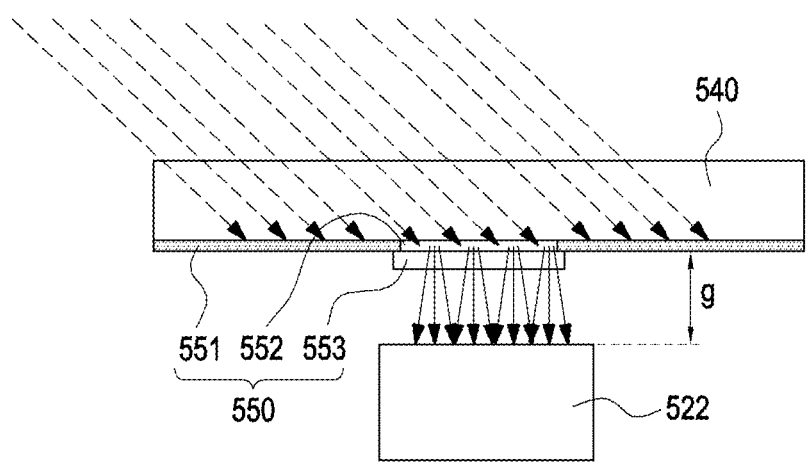
FIG. 9C is a view illustrating an example in which incident light is transmitted through a transparent member to a light receiving element in an electronic device with a scattering member according to an embodiment.

FIG. 8 is a concept view illustrating an electronic device including a scattering member and a light receiving element according to an embodiment. FIG. 9A is a concept view illustrating a transparent member 540 and a scattering member 553 according to an embodiment. FIG. 9B is a view illustrating an example in which incident light is transmitted through a transparent member 540 to a light receiving element 522 when no scattering member 553 is provided according to an embodiment. FIG. 9C is a view illustrating an example in which incident light is transmitted through a transparent member 540 to a light receiving element 522 in an electronic device (e.g., 400 of FIG. 4A) with a scattering member according to an embodiment.

Referring to FIG. 8, according to an embodiment, an electronic device (e.g., 400 of FIG. 4A) may include a transparent member 540, a scattering member 553 disposed under a portion of the transparent member 540 to scatter light incident at a designated angle from an outside of the electronic device through the transparent member 540, and a light receiving element 522 disposed under the portion to obtain at least part of the light scattered by the scattering member 553. The electronic device (e.g., 400 of FIG. 4A) may include a control circuit 560 configured to determine the brightness of the incident light based on, at least, the scattered light obtained by the light receiving element 522.

Referring to FIGS. 8 to 9C, according to an embodiment, the mobile electronic device (e.g., 400 of FIG. 4A) may include the transparent member 540 to enhance the FOV as described above in connection with FIGS. 6 and 7. The light receiving element 522 may be positioned under a portion of the transparent member 540.

According to an embodiment, the transparent member 540 may be integrally formed with at least part of the front plate (e.g., 402 of FIG. 4A). According to an embodiment, the transparent member 540 may correspond to a substantially transparent portion of the front plate (e.g., 402 of FIG. 4A). According to an embodiment, the transparent member 540 may be mounted in a hole (e.g., a first hole (e.g., 510 of FIG. 4) or a second hole (e.g., 520 of FIG. 4) formed in the front surface (e.g., 502 of FIG. 4A). For example, the transparent member 540 may be a glass or glass plate used in the mobile electronic device. According to an embodiment, the transparent member 540 may be a transparent portion of the rear plate (e.g., 211 of FIG. 2A) which is formed to be overall opaque. According to an embodiment, the transparent member 540 may form a portion of the side bezel structure (e.g., 218 of FIG. 2A). Described below is an embodiment in which the transparent member 540 is integrally formed with at least part of the front plate (e.g., 402 of FIG. 4A).

According to an embodiment, the transparent member 540 may form the outer surface of the electronic device (e.g., 400 of FIG. 4A) and protect the electronic components (e.g., a processor or memory) inside the electronic device (e.g., 400 of FIG. 4A) from external impacts. According to an embodiment, the electronic components inside the electronic device (e.g., 400 of FIG. 4A) may be observed (or identified) through the transparent member 540 from the outside. According to an embodiment, incident light from the outside of the electronic device (e.g., 400 of FIG. 4A) may be transmitted through the tm4 to the inside of the electronic device (e.g., 400 of FIG. 4A). According to an embodiment, when the light receiving element 522 is positioned under the transparent member 540, the light transmitted through the transparent member 540 may be received by the light receiving element 522, thereby allowing information about the outside of the electronic device (e.g., 400 of FIG. 4A) to be obtained.

According to an embodiment, the light receiving element 522 may be aligned under a portion of the transparent member 540. As shown in FIG. 8, the area of the transparent member 540 may be larger than the area of the light receiving element 522. Some of light incident onto the transparent member 540 may reach the light receiving element 522 while others may be blocked and thus fail to reach the light receiving element 522.

According to an embodiment, the light receiving element 522 may not be disposed immediately adjacent a portion of the transparent member 540. The light receiving element 522 may be disposed in a space formed under the transparent member 540 while being spaced a designated distance (e.g., g of FIGS. 9B and 9C) away from the transparent member. Thus, the light transmitted through the transparent member 540 to the inside of the electronic device may travel a predetermined distance from the transparent member and reach the light receiving element. As in the embodiment of FIG. 9B, when the second light beam is incident, the light receiving element 522 may obtain information by a tiny amount of incident light.

Referring to FIGS. 8 and 9, according to an embodiment, the electronic device (e.g., 400 of FIG. 4A) may include the scattering member 553. The scattering member 553 may be disposed under a portion of the transparent member 540 and be formed of a material to scatter light incident at a designated angle from the outside of the electronic device (e.g., 400 of FIG. 4A) through the transparent member 540. The light incident at the designated angle through the transparent member 540 may be irregularly reflected to spread in various directions while passing through the scattering member 553. According to an embodiment, the scattering member 553 may be formed of a set of a plurality of fine particles which are substantially opaque. According to an embodiment, the scattering member 553 may be formed on the bottom of a portion of the transparent member 540 by, e.g., application, deposition, or coating. Forming the scattering member 553 under the transparent member 540 is not limited to the methods but other various methods may apply.

For example, the scattering member 553 may be formed of white pigment (white resist, white ink, white paint, etc.) with high light scatterability. Examples of white pigment may include titanium oxide, aluminum oxide, zinc oxide, lead carbonate, barium sulfate, or calcium carbonate. The scattering member 553 may include fine particles. As incident light hits the scattering member 553, the light may be scattered in various directions. According to an embodiment, the light receiving element 522 may obtain about an external object (e.g., 600 of FIG. 5) or information about the surroundings of the electronic device (e.g., 400 of FIG. 4A) from the scattered light.

Referring to FIGS. 8 to 9C, according to an embodiment, the electronic device (e.g., 400 of FIG. 4A) may further include a light absorbing member 552 disposed between a portion of the transparent member 540 and the scattering member 553. The light absorbing member 552 may absorb at least part of the light reflected by the scattering member 553. According to an embodiment, the light absorbing member 552 may be formed on the bottom of a portion of the transparent member 540 by, e.g., application, deposition, or coating. According to an embodiment, the light absorbing member 552 may include a material that absorbs visible bands of light while transmitting IR bands of light. For example, an IR ink, IR pigment, or IR film may correspond to the light absorbing member 552. The light absorbing member 552 may absorb at least part of the visible light band of the incident light from the outside of the electronic device (e.g., 400 of FIG. 4A) and the visible light band of the light reflected by the scattering member 553, thereby preventing the electronic components inside the electronic device (e.g., 400 of FIG. 4A) from being viewed from the outside. Since IR bands of light mostly may be transmitted, it may be identified through the IR band of light obtained by the light receiving element whether the external object approaches the electronic device. According to an embodiment, a shielding member 551 may be formed under the transparent member 540 to fully block visible light and IR light. The light absorbing member 552 may be a member formed in a portion of the shielding member 551 and may have a designated light absorption rate and light transmittance.

According to an embodiment, the scattering member 553 may be formed adjacent the transparent member 540 and under a portion of the transparent member 540. The scattering member 553 and the transparent member 540 may form a layered structure. When the light absorbing member 552 is further included, the scattering member 553, together with the light absorbing member 552 and the transparent member 540, may form a stack structure. In this case, the transparent member 540, the light absorbing member 552, and the scattering member 553 may be arranged in order from the front surface of the electronic device (e.g., 400 of FIG. 4A).

According to an embodiment, the electronic device (e.g., 400 of FIG. 4A) may include a control circuit 560. The control circuit 560 may be configured to determine the brightness of incident light based on, at least, the scattered light obtained through the light receiving element 522. The control circuit 560 may determine the brightness of incident light to thereby control the brightness when displaying content on the display (e.g., 401 of FIG. 4A), thus being able to save the power of battery mounted in the electronic device (e.g., 400 of FIG. 4A).

According to an embodiment, the control circuit 560 may be mounted on a circuit board and may be formed as various electronic components, such as a processor or memory, or in a combination thereof. According to an embodiment, the processor may perform control on at least one other components of the electronic device and/or computation or data processing regarding communication. The processor may control multiple hardware and software components connected to the processor by running, e.g., an operating system or application programs, and the processor may process or compute various data. According to an embodiment, the processor may include one or more of a central processing unit (CPU), an application processor (AP), or a communication processor (CP). The processor may be implemented in, e.g., a system on chip (SoC). According to an embodiment, the memory may include, e.g., a volatile and/or non-volatile memory. For example, the memory may store commands or data related to at least one other component of the electronic device. According to an embodiment, the memory may store software and/or a program.

According to an embodiment, the control circuit 560 may determine the degree of approach by an external object (e.g., 600 of FIG. 5) based on, at least, the brightness of incident light. According to an embodiment, the control circuit 560 may generate biometric information corresponding to the external object (e.g., 600 of FIG. 5) based on, at least, the brightness of incident light.

Referring to FIG. 8, the control circuit 560 may be positioned outside the sensor module 500 (e.g., on the printed circuit board of the electronic device (e.g., 400 of FIG. 4A)) and be electrically connected with the light receiving element 522 disposed inside the sensor module 500 through a conductive line 561. However, embodiments of the disclosure are not limited. The control circuit 560 may be integrated with the sensor module 500 inside the sensor module 500.

A sensor module and a connecting member mounted on a printed circuit board are described below with reference to FIG. 10.

Figure 10:
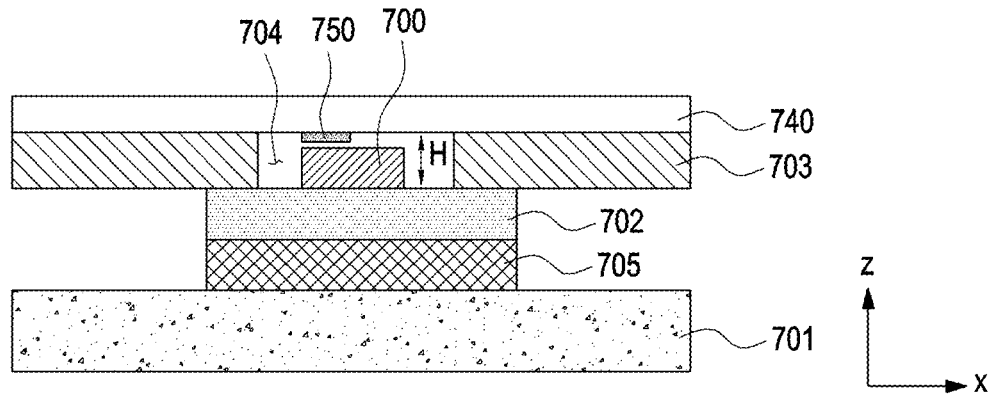
FIG. 10 is a cross-sectional view illustrating the inside of a sensor module and an electronic device according to an embodiment.
Figure 11:
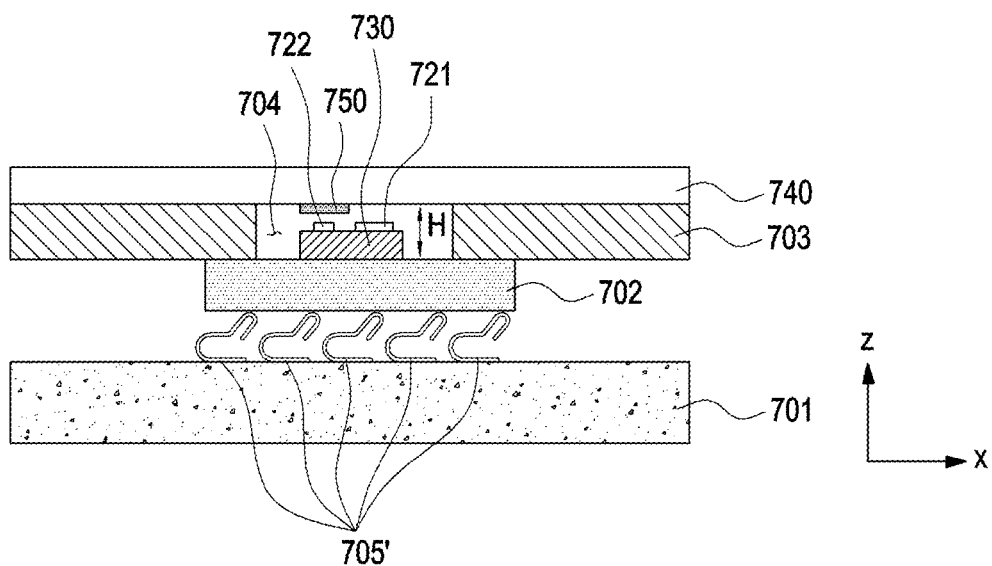
FIG. 11 is a cross-sectional view illustrating a sensor module and an electronic device according to an embodiment different from the embodiment of FIG. 10.

FIG. 10 is a cross-sectional view illustrating the inside of a sensor module 700 and an electronic device (e.g., 400 of FIG. 4A) according to an embodiment. FIG. 11 is a cross-sectional view illustrating a sensor module (e.g., 700 of FIG. 10) and an electronic device (e.g., 400 of FIG. 4A) according to an embodiment different from the embodiment of FIG. 10.

According to an embodiment, the electronic device (e.g., 400 of FIG. 4A) may include a printed circuit board (hereinafter, a 'circuit board'). According to an embodiment, a sensor may be mounted on the circuit board and so other various electronic components may be, such as a processor (e.g., an application processor in charge of the overall operation of the system or a display driver integrated circuit (DDI)). According to an embodiment, the circuit board may be divided into a second circuit board 702 where electronic components, e.g., a sensor hub in charge of the overall operation of the sensor module 700, are mounted and a first circuit board 701 where electronic components, e.g., a processor (e.g., an application processor or DDI) is mounted. When the circuit board is divided into the second circuit board 702 and the first circuit board 701, the sensor module 700 may be mounted on the second circuit board 702, and the second circuit board 702 where the sensor module 700 is mounted may be mounted on the first circuit board 701. According to an embodiment, the second circuit board 702 may be an interposer for electrical interface routing between one component and another.

Referring to FIG. 10, a space 704 may be formed between the second circuit board 702 and the transparent member 740. The space 704 may correspond to the first space 511 or second space 521 described above in connection with FIG. 5. The electronic device (e.g., 400 of FIG. 4A) may include a bracket 703 which is a component to form the space 704. According to an embodiment, a light receiving element (e.g., 522 of FIG. 5) may be positioned in the space 704 formed by the bracket 703 under the transparent member 740 and the bracket 703 supporting at least part of the bottom of the transparent member 740. The bracket 703 may be supported by the second circuit board 702 to thereby form a gap between the transparent member 740 and the second circuit board 702. The gap between the transparent member 740 and the second circuit board 702 may correspond to the height H of the bracket 703.

According to an embodiment, the sensor module 700 may be positioned relatively near the transparent member 740 in the inner space of the electronic device (e.g., 400 of FIG. 4A). Thus, the sensor module 700 may be spaced apart from the top surface of the first circuit board 701 by a predetermined distance. According to an embodiment, unless the bottom of the sensor module 700 is stably supported, a significant FOV deviation may occur even in the same use environment.

Referring to FIG. 10, according to an embodiment, the electronic device (e.g., 400 of FIG. 4A) may further include a connecting member 705 disposed on a circuit board and formed to have a designated height. The connecting member 705 may be disposed between the second circuit board 702 and the first circuit board 701. Although the sensor module 700 is spaced apart from the first circuit board 701 by a predetermined distance, the connecting member 705 may stably support the second circuit board 702 and, thus, the sensor module 700 may be left in the fixed position. According to an embodiment, the connecting member 705 may electrically connect the second circuit board 702 and the first circuit board 701.

Referring to FIG. 11, a sensor module (e.g., 700 of FIG. 10) in which a light emitting element 721 and a light receiving element 722 are mounted on the top surface of the body part 730 and C-clips 705 as an example of the connecting member (e.g., 705 of FIG. 10) are shown.

When the sensor module (e.g., 700 of FIG. 10) includes the light emitting element 721 and the light receiving element 722, an optical material printed layer 750 may be formed under a portion of the transparent member 740. The optical material printed layer 750 may be formed in an area corresponding to where the light receiving element 722 is disposed. When a scattering member (e.g., 553 of FIG. 8) is included in the optical material printed layer 750, crosstalk which may occur when a scattering member is used may be addressed by using the connecting member (e.g., 705 of FIG. 10).

According to an embodiment, as the connecting member (e.g., 705 of FIG. 10), a plurality of C-clips 705' may be used. Each C-clip may have one side contacting the first circuit board 701 and the other side contacting the second circuit board 702 as shown. The air gap (e.g., g of FIGS. 9A and 9B) between the light receiving element 722 and the transparent member 740 may be maintained using the structural elasticity of the C-clips, thereby addressing the crosstalk issue.

Referring to FIG. 11, as the connecting member (e.g., 705 of FIG. 10), C-clips 705' are shown. A single C-clip 705' may be used according to an embodiment or, alternatively, a plurality of C-clips 705' may be used.

Referring to Tables 1 to 4, according to an embodiment, the light transmittance of the electronic device with the scattering member (e.g., 553 of FIG. 9A) and the light absorbing member (e.g., 552 of FIG. 9A) is described as an example. In the embodiment described in connection with Tables 1 to 4, the transmittance may correspond to the transmittance of visible light. Table 1 may represent FOVs compared per sensor (Sample #1 to #4) according to an embodiment. In the following table, the parameters R/G/B/C on the vertical axis may represent the subpixels (or channels), and the parameters up/down/left/right on the horizontal axis may represent the direction of incident light to the electronic device.

TABLE 1

|  | Up | Down | Left | Right | AVG |
| --- | --- | --- | --- | --- | --- |
| Sample#1 | | | | | |
| R | 40° | 40° | 41° | 37° | 39.5° |
| G | 48° | 48° | 48° | 47° | 47.7° |
| B | 47° | 45° | 47° | 45° | 46° |
| C | 47° | 46° | 47° | 45° | 46.2° |
| Sample#2 | | | | | |
| R | 37° | 36° | 35° | 37° | 36.2° |
| G | 47° | 43° | 44° | 46° | 45° |
| B | 40° | 37° | 38° | 38° | 38.2° |
| C | 46° | 43° | 43° | 45° | 44.2° |
| Sample#3 | | | | | |
| R | 50° | 53° | 51° | 45° | 49.7° |
| G | 45° | 45° | 43° | 44° | 44.2° |
| B | 43° | 43° | 43° | 43° | 43° |
| C | 33° | 50° | 47° | 43° | 43.2° |
| Sample#4 | | | | | |
| R | 57° | 57° | 60° | 57° | 57.7° |
| G | 46° | 46° | 48° | 46° | 46.5° |
| B | 53° | 52° | 55° | 57° | 54.2° |
| C | 55° | 52° | 57° | 53° | 54.2° |

A look at Table 1 above reveals that not only per-sensor FOV deviations but also per-subpixel (RGBC) or per-incident light direction FOV deviations occur according to an embodiment. According to an embodiment, as the photodiode responsivity may be varied depending on the filter characteristics of each subpixel (RGBC), a deviation per subpixel (RGBC) may occur depending on the angle of incident light.

According to an embodiment, a scattering member (e.g., 553 of FIG. 9A) may be formed on the path along which light is incident, thereby evenly distributing the incident light and hence reducing the deviation per subpixel (RGBC).

The following tables, Tables 2 to 4, may represent FOVs actually measured on the electronic device including a scattering member (e.g., 553 of FIG. 9A) with a light transmittance in a sensor module having a FOV of 50 degrees, as designed and designated, in the environment where a right-hand light source is provided. In the following example, a white ink (no-ink) with a light transmittance of 100%, a white ink with a light transmittance of 50%, and a white ink with a light transmittance of 30% are exemplified. In the same experimental environment, the mean FOV values according to the embodiments are measured and compared. According to an embodiment, if the content of scattering member (e.g., white ink) in the solvent which is coated on the bottom of the transparent member 540 increases, the light transmittance may gradually reduce.

Table 2 below may represent the FOV actually measured in a no-ink state, i.e., in the state where the light transmittance of the scattering member (e.g., 553 of FIG. 9A) in the transparent member (e.g., 540 of FIG. 9A) is 100%.

TABLE 2

| | No-ink transmittance 100% | | | | |
| --- | --- | --- | --- | --- | --- |
| | Measured FOV (right) mean: 44 degrees | | | | horizontal |
| angle | −55 | −50 | −45 | −40 | 0 |
| C | 745 | 1050 | 1478 | 1828 | 2855 |
| C/horizontal C | 26% | 37% | 52% | 64% | 100% |
| R | 440 | 669 | 976 | 1279 | 2382 |
| R/horizontal R | 18% | 28% | 41% | 54% | 100% |
| G | 961 | 1341 | 1849 | 2256 | 3300 |
| G/horizontal G | 29% | 41% | 56% | 68% | 100% |
| B | 572 | 808 | 1125 | 1396 | 2155 |
| B/horizontal B | 27% | 37% | 52% | 65% | 100% |

Table 3 below may represent the FOV actually measured upon using a scattering member (e.g., 50%-transmittance white ink) with a light transmittance of 50% as an example of the scattering member (e.g., 553 of FIG. 9A) printed on the transparent member (e.g., 540 of FIG. 9A).

TABLE 3

| | White ink transmittance 50% | | | | |
| --- | --- | --- | --- | --- | --- |
| | Measured FOV (right) mean: 45 degrees | | | | horizontal |
| angle | −55 | −50 | −45 | −40 | 0 |
| C | 594 | 801 | 1085 | 1328 | 2090 |
| C/horizontal C | 28% | 38% | 52% | 64% | 100% |
| R | 385 | 535 | 742 | 945 | 1671 |
| R/horizontal R | 23% | 32% | 44% | 57% | 100% |
| G | 748 | 999 | 1340 | 1623 | 2455 |
| G/horizontal G | 30% | 41% | 55% | 66% | 100% |
| B | 448 | 602 | 815 | 1000 | 1562 |
| B/horizontal B | 29% | 39% | 52% | 64% | 100% |

Table 4 below may represent the FOV actually measured upon using a scattering member (e.g., 30%-transmittance white ink) with a light transmittance of 30% as an example of the scattering member (e.g., 553 of FIG. 9A) printed on the transparent member (e.g., 540 of FIG. 9A).

TABLE 4

White ink transmittance 30%

Measured FOV (right) mean: 45 degrees     horizontal

| angle | −55 | −50 | −45 | −40 | 0 |
|---|---|---|---|---|---|
| C | 545 | 709 | 923 | 1116 | 1750 |
| C/horizontal C | 31% | 41% | 53% | 64% | 100% |
| R | 366 | 486 | 640 | 795 | 1359 |
| R/horizontal R | 27% | 36% | 47% | 58% | 100% |
| G | 678 | 880 | 1135 | 1368 | 2077 |
| G/horizontal G | 33% | 42% | 55% | 66% | 100% |
| B | 409 | 531 | 690 | 837 | 1302 |
| B/horizontal B | 31% | 41% | 53% | 64% | 100% |

From Tables 2 to 4, it may be identified that when the light transmittance of the scattering member (e.g., 553 of FIG. 9A) is 100%, the actually measured FOV is 44 degrees and thus fails to reach the designed mean value, 50 degrees. It may also be identified that when the light transmittance of the scattering member (e.g., 553 of FIG. 9A) is 50% and 30%, the actually measured FOVs are 45 degrees and fail to reach the designed mean value, 50 degrees (here, whether the FOV measurement meets the mean FOV value is determined based on a 2% error margin).

The following tables, Tables 5 to 6, may represent FOVs actually measured on the electronic device including a scattering member (e.g., 553 of FIG. 9A) with a light transmittance in a sensor module having a FOV of 50 degrees, as designed and designated, in the environment where a right-hand light source is provided. A white ink with a transmittance of 10% and a white ink with a transmittance of 1% are shown as example scattering members (e.g., 553 of FIG. 8) printed on the transparent member (e.g., 540 of FIG. 8). In the same experimental environment, the mean FOV values according to the embodiments are measured and compared.

Table 5 below may represent the FOV actually measured in the state where the light transmittance of the scattering member (e.g., 553 of FIG. 9A) in the transparent member (e.g., 540 of FIG. 9A) is 10% (e.g., a 10%-light transmittance white ink).

TABLE 5

White ink transmittance 10%

Measured FOV (right) mean: 48 degrees     horizontal

| angle | −55 | −50 | −45 | −40 | 0 |
|---|---|---|---|---|---|
| C | 396 | 486 | 600 | 717 | 1042 |
| C/horizontal C | 38% | 47% | 58% | 69% | 100% |
| R | 277 | 340 | 421 | 507 | 759 |
| R/horizontal R | 36% | 45% | 55% | 67% | 100% |
| G | 488 | 596 | 735 | 880 | 1265 |
| G/horizontal G | 39% | 47% | 58% | 70% | 100% |
| B | 293 | 357 | 443 | 529 | 770 |
| B/horizontal B | 38% | 46% | 58% | 69% | 100% |

Table 6 below may represent the FOV actually measured upon using a scattering member (e.g., 1%-transmittance white ink) with a light transmittance of 1% as an example of the scattering member (e.g., 553 of FIG. 9A) printed on the transparent member (e.g., 540 of FIG. 9A).

TABLE 6

White ink transmittance 1%

Measured FOV (right) mean: 50 degrees     horizontal

| angle | −55 | −50 | −45 | −40 | 0 |
|---|---|---|---|---|---|
| C | 211 | 254 | 310 | 366 | 503 |
| C/horizontal C | 42% | 50% | 62% | 73% | 100% |
| R | 160 | 192 | 235 | 277 | 379 |
| R/horizontal R | 42% | 51% | 62% | 73% | 100% |
| G | 259 | 311 | 381 | 448 | 614 |
| G/horizontal G | 42% | 51% | 62% | 73% | 100% |
| B | 141 | 168 | 207 | 244 | 335 |
| B/horizontal B | 42% | 50% | 62% | 73% | 100% |

From Tables 5 and 6, it may be identified that at a light transmittance of 10% (10%-transmittance white ink) for the scattering member (e.g., 553 of FIG. 9A), an FOV of 48 degrees, which is close to the designed mean value, 50 degrees, is measured and, in the embodiment where the light transmittance is 1% (1%-transmittance white ink), an FOV of 50 degrees, which is the designed mean value, is measured.

According to an embodiment, a scattering member (e.g., 553 of FIG. 9A) with a light transmittance more than 0% and less than 1% may be used. To achieve the light transmittance more than 0% and less than 1% for the scattering member (e.g., 553 of FIG. 9A), the content of the scattering member (e.g., 553 of FIG. 9A) in the solvent coated on the transparent member (e.g., 540 of FIG. 9A) may be excessively increased and, thus, the scattering member (e.g., 553 of FIG. 9A) may excessively be exposed (visible from the outside) to the outside of the transparent member (e.g., 540 of FIG. 9A). Thus, according to an embodiment, the light transmittance of the scattering member (e.g., 553 of FIG. 9A) may be designated to be not less than 1% and not more than 10%.

According to the above-described embodiments, there may be provided a proximity-illuminance sensor and electronic device which has a scattering member along the light incident path to facilitate securing an FOV and thus be able to obtain a high degree of illuminance (lux) although the light incident opening reduces in size.

According to an embodiment, the light transmittance may mean the transmittance of visible light (e.g., a 550 nm band). The light transmittance may be reduced as the content of the scattering member (e.g., 553 of FIG. 9A) in the solvent coated under the transparent member (e.g., 540 of FIG. 9A) increases. As set forth above, when the content of the scattering member (e.g., 553 of FIG. 9A) increases, the scattering member (e.g., 553 of FIG. 9A) may have a chance of being visible from the outside of the electronic device. This may spoil the outer appearance of the electronic device.

According to an embodiment, a light absorbing member (e.g., 552 of FIG. 9A) with a low transmittance for visible light and a high transmittance for IR light may be disposed on top of the scattering member (e.g., 553 of FIG. 9A). The scattering member (e.g., 553 of FIG. 9A) is visible from outside of the electronic device in the visible light band. Such issue may be addressed using the light absorbing member (e.g., 552 of FIG. 9A). For example, the light absorbing member (e.g., 552 of FIG. 9A) may be designated with a transmittance more than 0% and less than 7% for visible light (of, e.g., a 550 nm band) and a transmittance more than 85% and less than 100% for IR light (of, e.g., a 940 nm band).

Table 7 below represents variations in haze value of IR ink depending on various visible light transmittances.

TABLE 7

| | Haze value | | | | | | | |
|---|---|---|---|---|---|---|---|---|
| | IR ink transmittance 100% | IR ink transmittance 10% | IR ink transmittance 9% | IR ink transmittance 8% | IR ink transmittance 7% | IR ink transmittance 5% | IR ink transmittance 3% | IR ink transmittance 1% |
| White ink transmittance 40% | 85 | 85 | 84 | 79 | 64 | 52 | 18 | 5 |
| White ink transmittance 20% | 96 | 96 | 95 | 93 | 77 | 64 | 31 | 8 |
| White ink transmittance 10% | 100 | 100 | 100 | 98 | 91 | 77 | 55 | 27 |
| White ink transmittance 5% | 100 | 100 | 100 | 99 | 95 | 80 | 69 | 39 |

It may be identified from Table 7 that as the visible light transmittance of IR ink reduces, the haze value decreases. 'Haze value decreases' may mean that the scattering member (e.g., 553 of FIG. 9A) is not visible from outside of the electronic device. Thus, the issue of being visible from outside, which occurs as the scattering member (e.g., 553 of FIG. 9A) is provided in the electronic device, may be addressed by the light absorbing member (e.g., 552 of FIG. 9A). It may be identified from Table 7 that when the visible light (e.g., 550 nm) transmittance of the light absorbing member (e.g., 552 of FIG. 9A) is designated to be more than 0% and less than 7%, the visible issue due to the scattering member may effectively be addressed.

According to an embodiment, the crosstalk issue which may arise as the scattering member (e.g., 553 of FIG. 9A) is provided may be addressed by maintaining the distance between the light receiving element (e.g., 522 of FIG. 9C) and the transparent member (e.g., 740 of FIG. 10) where the scattering member (e.g., 553 of FIG. 9A) is formed using the connecting member (e.g., 705 of FIG. 10) and the structure of the electronic device and the sensor module according to an embodiment.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, an electronic device (e.g., 400 of FIG. 4A) comprises a transparent member (e.g., 540 of FIG. 8), a scattering member (e.g., 553 of FIG. 8) disposed under a portion of the transparent member to scatter light incident at a designated angle from an outside of the electronic device through the transparent member, a light receiving element (e.g., 522 of FIG. 8) disposed under the portion and configured to obtain light at least partially scattered by the scattering member, and a control circuit (e.g., 560 of FIG. 8) configured to determine a brightness of the incident light based on, at least, the scattered light obtained through the light receiving element.

According to an embodiment, the electronic device may further comprise a light emitting element to emit a designated wavelength of light, wherein the incident light includes the designated wavelength of light emitted from the light emitting element and reflected by an external object (e.g., 600 of FIG. 5).

According to an embodiment, the control circuit may be configured to determine a degree of approach of the external object based on, at least, the brightness of the incident light.

According to an embodiment, the control circuit may be configured to generate biometric information corresponding to the external object based on, at least, the brightness of the incident light.

According to an embodiment, the scattering member may be disposed adjacent the transparent member.

According to an embodiment, the scattering member may include a white pigment to scatter light. The portion may be coated with the white pigment.

According to an embodiment, the scattering member may have a light transmittance not less than 1% and not more than 10% for a 550 nm band of light.

According to an embodiment, the electronic device may further comprise a light absorbing member (e.g., 552 of FIG. 9A) disposed between the portion of the transparent member and the scattering member to absorb at least part of light reflected by the scattering member.

According to an embodiment, the light absorbing member may include a material to block visible light (e.g., a visible light band (or wavelength) of light) to reduce visibility of an inside of the transparent member while transmitting infrared (IR) light (e.g., an IR band (or wavelength) of light). In other words, the visible light band may have a low transmittance, and the IR band may have a high transmittance.

According to an embodiment, the light absorbing member may have a light transmittance more than 0% and not more than 7% for a 550 nm band of light.

According to an embodiment, the electronic device may further comprise a connecting member (e.g., 705 of FIG. 10) to maintain a predetermined distance between the light receiving element and the transparent member.

According to an embodiment, the electronic device may further comprise a first circuit board (e.g., 701 of FIG. 10) and a second circuit board (e.g., 702 of FIG. 10) on which the light receiving element is mounted. The connecting member may electrically connect the first circuit board with the second circuit board.

According to an embodiment, the connecting member may be a C-clip with a first side contacting the first circuit board and a second side contacting the second circuit board.

According to an embodiment, the connecting member may include a plurality of C-clips.

According to an embodiment, the electronic device may further comprise a bracket (e.g., 703 of FIG. 10) with at least a portion disposed between the transparent member and the second circuit board.

According to an embodiment, an electronic device comprises a display (e.g., 401 of FIG. 4A), a bezel formed to surround at least a portion of the display, a sensor module (e.g., 500 of FIG. 4A) disposed in the bezel and including a transparent member (e.g., 540 of FIG. 9C) formed on an upper surface of the bezel and at least one light receiving element (e.g., 522 of FIG. 9C) identified from an outside of the electronic device through the transparent member, a scattering member (e.g., 553 of FIG. 9C) disposed under the transparent member to scatter light coming from the outside of the electronic device to the light receiving element, and a light absorbing member (e.g., 552 of FIG. 9C) absorbing the light reaching the light receiving element.

According to an embodiment, the light absorbing member may be formed between the transparent member and the scattering member.

According to an embodiment, the scattering member may be formed under a portion of the transparent member. The scattering member may have a light transmittance not less than 1% and not more than 10% for a 550 nm band of light. The light absorbing member may be formed corresponding to where the scattering member is formed. The light absorbing member may have a light transmittance more than 0% and not more than 7% for a 550 nm band of light.

According to an embodiment, a sensor module comprises a housing (e.g., 530 of FIG. 5) including a front surface (e.g., 502 of FIG. 5), a rear surface (e.g., the opposite surface of the front surface), and a side surface surrounding the front surface and the rear surface, at least one opening (e.g., 510 and 520 of FIG. 5) formed in the front surface, a transparent member (e.g., 540 of FIG. 8) disposed inside the housing to abut the front surface, a scattering member (e.g., 553 of FIG. 8) disposed under a portion of the transparent member corresponding to the at least one opening to scatter light incident at a designated angle from an outside of the sensor module through the opening, and a light receiving element (e.g., 552 of FIG. 8) disposed under the at least one opening and configured to obtain light at least partially scattered by the scattering member.

According to an embodiment, the sensor module may further comprise a light absorbing member disposed between the portion of the transparent member and the scattering member to absorb at least part of light reflected by the scattering member.

As is apparent from the foregoing description, according to various embodiments of the disclosure, there may be provided a proximity-illuminance sensor and electronic device which has a scattering member along the light incident path to facilitate securing an FOV and thus be able to obtain a proper degree of illuminance (lux) although the light incident opening reduces in size.

The crosstalk issue which may arises as the scattering member is provided may be addressed by the structure of the sensor module and electronic device and maintaining a predetermined distance between the transparent member where the scattering member is formed and the light receiving element by the connecting member.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a transparent member;
a scattering member disposed under a portion of the transparent member to scatter light incident at a designated angle from an outside of the electronic device through the transparent member;
a light receiving element disposed under the portion and configured to obtain scattered light that is scattered by the scattering member from at least a part of incident light;
a control circuit configured to determine a brightness of the incident light based on, at least, the scattered light obtained through the light receiving element;
a connecting member disposed under the light receiving element and configured to maintain a predetermined distance between the light receiving element and the transparent member;
a first circuit board; and
a second circuit board,
wherein the light receiving element is mounted on the second circuit board,
wherein the connecting member electrically connects the first circuit board with the second circuit board, and
wherein the connecting member is a C-clip comprising a first side contacting the first circuit board and a second side contacting the second circuit board.

2. The electronic device of claim 1, further comprising a light emitting element to emit a designated wavelength of light,
wherein the incident light includes the designated wavelength of light emitted from the light emitting element and reflected by an external object.

3. The electronic device of claim 2, wherein the control circuit is configured to determine a degree of approach of the external object based on the brightness of the incident light.

4. The electronic device of claim 2, wherein the control circuit is configured to generate biometric information corresponding to the external object based on the brightness of the incident light.

5. The electronic device of claim 1, wherein the scattering member is disposed adjacent to the transparent member.

6. The electronic device of claim 1, wherein:
the scattering member includes a white pigment to scatter light; and
the portion is coated with the white pigment.

7. The electronic device of claim 1, wherein the scattering member includes a light transmittance not less than 1% and not more than 10% for a 550 nm band of light.

8. The electronic device of claim 1, further comprising a light absorbing member disposed between the portion of the transparent member and the scattering member to absorb at least part of light reflected by the scattering member.

9. The electronic device of claim 8, wherein the light absorbing member comprises a material to block visible light to reduce visibility of an inside of the transparent member while transmitting infrared (IR) light.

10. The electronic device of claim 8, wherein the light absorbing member includes a light transmittance more than 0% and not more than 7% for a 550 nm band of light.

11. The electronic device of claim 1, wherein the connecting member includes a plurality of C-clips.

12. The electronic device of claim 11, further comprising a bracket that is at least partly disposed between the transparent member and the second circuit board.

13. An electronic device, comprising:
a display;
a bezel formed to surround at least a portion of the display;
a sensor module disposed in the bezel, the sensor module including a transparent member formed on an upper surface of the bezel and at least one light receiving element disposed under the transparent member;
a scattering member disposed between the transparent member and the light receiving element to scatter light coming from the outside of the electronic device to the light receiving element;
a light absorbing member to absorb the light reaching the light receiving element, wherein the light absorbing member is formed between the transparent member and the scattering member;
a connecting member disposed under the light receiving element and configured to maintain a predetermined distance between the light receiving element and the transparent member;
a first circuit board; and
a second circuit board,
wherein the light receiving element is mounted on the second circuit board,
wherein the connecting member electrically connects the first circuit board with the second circuit board, and
wherein the connecting member is a C-clip comprising a first side contacting the first circuit board and a second side contacting the second circuit board.

14. The electronic device of claim 13, wherein:
the scattering member is formed under a portion of the transparent member; and
the scattering member includes a light transmittance not less than 1% and not more than 10% for a 550 nm band of light.

15. The electronic device of claim 13, wherein:
the light absorbing member is formed corresponding to where the scattering member is formed; and
the light absorbing member includes a light transmittance more than 0% and not more than 7% for a 550 nm band of light.

16. A sensor module, comprising:
a housing including a front surface that comprises at least one opening, a rear surface, and a side surface surrounding the front surface and the rear surface;
a transparent member disposed inside the housing to abut the front surface;
a scattering member disposed under a portion of the transparent member corresponding to the at least one opening to scatter light incident at a designated angle from an outside of the sensor module through the opening;
a light receiving element disposed under the at least one opening and configured to obtain light at least partially scattered by the scattering member;
a connecting member disposed under the light receiving element and configured to maintain a predetermined distance between the light receiving element and the transparent member;

a first circuit board; and
a second circuit board,
wherein the light receiving element is mounted on the second circuit board,
wherein the connecting member electrically connects the first circuit board with the second circuit board, and
wherein the connecting member is a C-clip comprising a first side contacting the first circuit board and a second side contacting the second circuit board.

17. The sensor module of claim 16, further comprising a light absorbing member disposed between the portion of the transparent member and the scattering member to absorb at least part of light reflected by the scattering member.

\* \* \* \* \*